(12) United States Patent
Kalina

(10) Patent No.: US 8,087,248 B2
(45) Date of Patent: Jan. 3, 2012

(54) METHOD AND APPARATUS FOR THE UTILIZATION OF WASTE HEAT FROM GASEOUS HEAT SOURCES CARRYING SUBSTANTIAL QUANTITIES OF DUST

(75) Inventor: Alexander I. Kalina, Hillsborough, CA (US)

(73) Assignee: Kalex, LLC, Belmonte, CA (US)

( * ) Notice: Subject to any disclaimer, the term of this patent is extended or adjusted under 35 U.S.C. 154(b) by 479 days.

(21) Appl. No.: 12/246,360

(22) Filed: Oct. 6, 2008

(65) Prior Publication Data

US 2010/0083662 A1  Apr. 8, 2010

(51) Int. Cl.
*F01K 7/34* (2006.01)
(52) U.S. Cl. .......................... 60/653; 60/670
(58) Field of Classification Search .............. 60/645, 60/653, 670
See application file for complete search history.

(56) References Cited

U.S. PATENT DOCUMENTS

| | | |
|---|---|---|
| 3,146,761 A | 9/1964 | Blodgett |
| 3,696,587 A | 10/1972 | Young et al. |
| 3,712,073 A | 1/1973 | Arenson |
| 3,867,907 A | 2/1975 | Marsch et al. |
| 3,979,914 A | 9/1976 | Weber |
| 4,010,246 A | 3/1977 | Steinrotter et al. |
| 4,164,849 A | 8/1979 | Mangus |
| 4,183,225 A | 1/1980 | Politte et al. |
| 4,324,102 A | 4/1982 | Woinsky |
| 4,326,581 A | 4/1982 | Rapier |
| 4,346,561 A | 8/1982 | Kalina ............... 60/673 |
| 4,433,545 A | 2/1984 | Chang |
| 4,442,679 A | 4/1984 | Stafford et al. |
| 4,489,563 A | 12/1984 | Kalina ............... 60/673 |
| 4,541,245 A * | 9/1985 | Becker et al. ............. 60/648 |
| 4,548,043 A | 10/1985 | Kalina ............... 60/673 |
| 4,586,340 A | 5/1986 | Kalina ............... 60/673 |
| 4,604,867 A | 8/1986 | Kalina ............... 60/653 |
| 4,619,809 A | 10/1986 | Schludergerg |
| 4,674,285 A | 6/1987 | Durrant et al. |
| 4,704,877 A | 11/1987 | Selcukoglu |
| 4,732,005 A | 3/1988 | Kalina ............... 60/673 |
| 4,739,713 A | 4/1988 | Vier et al. |
| 4,753,758 A | 6/1988 | Miller |
| 4,763,480 A | 8/1988 | Kalina ............... 60/649 |
| 4,817,392 A | 4/1989 | Agrawal et al. |
| 4,819,437 A | 4/1989 | Dayan |

(Continued)

FOREIGN PATENT DOCUMENTS

DE  1925234 A1  12/1970

(Continued)

OTHER PUBLICATIONS

U.S. Appl. No. 11/227,991, filed Sep. 15, 2005, Kalina.

(Continued)

*Primary Examiner* — Hoang Nguyen
(74) *Attorney, Agent, or Firm* — Robert W Strozier (57) ABSTRACT

An apparatus, system and method for transferring heat from a hot flue gas stream from a cement plant including large particles and dust to a working fluid of a power plant via a high temperature heat transfer fluid without exposing all or most of the equipment to the erosive force of the particles and dust is disclosed where the apparatus includes a cement plant, a particle separation and heat transfer system and a power plant.

14 Claims, 6 Drawing Sheets

U.S. PATENT DOCUMENTS

| | | | |
|---|---|---|---|
| 4,832,718 A | 5/1989 | Mehra | |
| 4,899,545 A | 2/1990 | Kalina | 60/673 |
| 4,982,568 A | 1/1991 | Kalina | 60/649 |
| 5,019,143 A | 5/1991 | Mehrta | |
| 5,029,444 A | 7/1991 | Kalina | 60/673 |
| 5,038,567 A | 8/1991 | Mortiz | |
| 5,095,708 A | 3/1992 | Kalina | 60/673 |
| 5,103,899 A | 4/1992 | Kalina | 165/104.13 |
| 5,440,882 A | 8/1995 | Kalina | 60/641.2 |
| 5,450,821 A | 9/1995 | Kalina | 122/1 R |
| 5,572,871 A | 11/1996 | Kalina | 60/649 |
| 5,588,298 A | 12/1996 | Kalina et al. | 60/676 |
| 5,603,218 A | 2/1997 | Hooper | |
| 5,649,426 A | 7/1997 | Kalina et al. | 60/649 |
| 5,754,613 A | 5/1998 | Hashiguchi et al. | |
| 5,784,888 A | 7/1998 | Termeuhlen | |
| 5,797,981 A | 8/1998 | Collin et al. | |
| 5,822,990 A | 10/1998 | Kalina et al. | 60/649 |
| 5,893,410 A | 4/1999 | Halbrook | |
| 5,950,433 A | 9/1999 | Kalina et al. | 60/649 |
| 5,953,918 A | 9/1999 | Kalina et al. | 60/653 |
| 6,015,451 A | 1/2000 | Anderson et al. | |
| 6,035,642 A | 3/2000 | Peletz et al. | |
| 6,058,695 A | 5/2000 | Ranasinghe et al. | |
| 6,065,280 A | 5/2000 | Ranasinghe et al. | |
| 6,158,220 A | 12/2000 | Hansen et al. | |
| 6,158,221 A | 12/2000 | Fancher et al. | |
| 6,167,705 B1 | 1/2001 | Hansen et al. | |
| 6,170,263 B1 | 1/2001 | Chow et al. | |
| 6,195,998 B1 | 3/2001 | Hansen et al. | |
| 6,202,418 B1 | 3/2001 | Gabrielli et al. | |
| 6,223,535 B1 | 5/2001 | Kitz | |
| 6,347,520 B1 | 2/2002 | Ranashinghe et al. | |
| 6,464,492 B1 | 10/2002 | Guarco et al. | 432/91 |
| 6,735,948 B1 | 5/2004 | Kalina | 60/649 |
| 6,769,256 B1 | 8/2004 | Kalina | 60/653 |
| 6,820,421 B2 | 11/2004 | Kalina | 60/649 |
| 6,829,895 B2 | 12/2004 | Kalina | 60/649 |
| 6,910,334 B2 | 6/2005 | Kalina | 60/651 |
| 6,923,000 B2 | 8/2005 | Kalina | 60/649 |
| 6,941,757 B2 | 9/2005 | Kalina | 60/649 |
| 6,964,168 B1 * | 11/2005 | Pierson et al. | 60/670 |
| 6,968,690 B2 * | 11/2005 | Kalina | 60/649 |
| 7,021,060 B1 | 4/2006 | Kalina | 60/649 |
| 7,043,919 B1 | 5/2006 | Kalina | 60/651 |
| 7,055,326 B1 | 6/2006 | Kalina | 60/649 |
| 7,065,967 B2 | 6/2006 | Kalina | 60/649 |
| 7,065,969 B2 | 6/2006 | Kalina | 60/670 |
| 7,104,784 B1 | 9/2006 | Hasegawa et al. | 431/4 |
| 7,197,876 B1 | 4/2007 | Kalina | 60/649 |
| 7,264,654 B2 | 9/2007 | Kalina | 95/228 |
| 7,340,897 B2 * | 3/2008 | Zimron et al. | 60/641.1 |
| 7,350,471 B2 | 4/2008 | Kalina | 110/348 |
| 7,398,651 B2 | 7/2008 | Kalina | 60/649 |
| 2001/0054288 A1 * | 12/2001 | Bronicki et al. | 60/653 |
| 2003/0154718 A1 | 8/2003 | Nayar | |
| 2003/0167769 A1 | 9/2003 | Bharathan | |
| 2004/0050048 A1 | 3/2004 | Kalina | |
| 2004/0055302 A1 | 3/2004 | Kalina | |
| 2004/0069015 A1 | 4/2004 | Paradowski | |
| 2004/0148935 A1 | 8/2004 | Kalina | |
| 2004/0182084 A1 | 9/2004 | Kalina | |
| 2005/0050891 A1 | 3/2005 | Kalina | |
| 2005/0061654 A1 | 3/2005 | Kalina | 203/21 |
| 2005/0066661 A1 | 3/2005 | Kalina | |
| 2005/0072152 A1 * | 4/2005 | Suzuki et al. | 60/649 |
| 2005/0183418 A1 | 8/2005 | Kalina | |
| 2005/0235645 A1 | 10/2005 | Kalina | |
| 2006/0096288 A1 | 5/2006 | Kalina | 60/649 |
| 2006/0096289 A1 | 5/2006 | Kalina | |
| 2006/0096290 A1 | 5/2006 | Kalina | 60/649 |
| 2006/0165394 A1 | 7/2006 | Kalina | 392/386 |
| 2006/0199120 A1 | 9/2006 | Kalina | 431/9 |
| 2007/0056284 A1 | 3/2007 | Kalina | |
| 2007/0068161 A1 | 3/2007 | Kalina | |
| 2007/0234722 A1 | 10/2007 | Kalina | |
| 2007/0234750 A1 | 10/2007 | Kalina | |
| 2008/0000225 A1 | 1/2008 | Kalina | |
| 2008/0053095 A1 | 3/2008 | Kalina | |
| 2010/0083662 A1 | 4/2010 | Kalina | |
| 2010/0101227 A1 | 4/2010 | Kalina | |
| 2010/0122533 A1 | 5/2010 | Kalina | |
| 2010/0146973 A1 | 6/2010 | Kalina | |
| 2010/0205962 A1 | 8/2010 | Kalina | |
| 2011/0024084 A1 | 2/2011 | Kalina | |
| 2011/0067400 A1 | 3/2011 | Kalina | |
| 2011/0174296 A1 | 7/2011 | Kalina | |

FOREIGN PATENT DOCUMENTS

| | | |
|---|---|---|
| DE | 3933731 A1 | 4/1990 |
| DE | 10335143 A1 | 2/2005 |
| EP | 0280453 A | 8/1988 |
| EP | 0472020 A | 2/1992 |
| EP | 0652368 A | 5/1995 |
| EP | 0694678 A | 1/1996 |
| EP | 0740052 A | 10/1996 |
| EP | 0949406 A | 10/1999 |
| EP | 0952316 A | 10/1999 |
| EP | 1058069 A | 12/2000 |
| EP | 1217299 A | 6/2002 |
| EP | 1254696 A | 11/2002 |
| EP | 1331444 A | 7/2003 |
| EP | 1936129 A2 | 6/2008 |
| FR | 1111784 A | 3/1956 |
| FR | 2821351 A | 8/2002 |
| FR | 2885169 A | 11/2006 |
| GB | 340780 A | 1/1931 |
| GB | 504114 A | 4/1939 |
| GB | 798786 A | 7/1958 |
| GB | 2335953 A | 10/1999 |
| JP | 61041850 A | 2/1986 |
| JP | 06026441 A | 2/1994 |
| KR | 100846128 B1 | 7/2008 |
| WO | WO9407095 | 3/1994 |
| WO | WO0165101 | 9/2001 |
| WO | WO03048529 | 6/2003 |
| WO | WO04001288 | 12/2003 |
| WO | WO2004033962 | 4/2004 |
| WO | WO2004070173 | 8/2004 |
| WO | WO2004102082 | 11/2004 |
| WO | WO2004109075 | 12/2004 |

OTHER PUBLICATIONS

U.S. Appl. No. 11/235,654, filed Sep. 22, 2005, Kalina.
U.S. Appl. No. 11/238,173, filed Sep. 28, 2005, Kalina.
U.S. Appl. No. 11/399,287, filed Apr. 5, 2006, Kalina.
U.S. Appl. No. 11/399,306, filed Apr. 5, 2006, Kalina.
U.S. Appl. No. 11/514,290, filed Aug. 31, 2006, Kalina.

* cited by examiner

METHOD AND APPARATUS FOR THE UTILIZATION OF WASTE HEAT FROM GASEOUS HEAT SOURCES CARRYING SUBSTANTIAL QUANTITIES OF DUST

BACKGROUND OF THE INVENTION

1. Field of the Invention

The present invention relates to an apparatus, system and method for transferring heat from a hot flue gas stream from a cement plant including large particles and dust to a working fluid of a power plant via a high temperature heat transfer fluid without exposing all or most of the equipment to the erosive force of the particles and dust.

More particularly, the present invention relates to an apparatus, system and method for transferring heat from a hot flue gas stream from a cement plant including large particles and dust to a working fluid of a power plant via a high temperature heat transfer fluid without exposing all or most of the equipment to the erosive force of the particles and dust, where the apparatus includes a cement plant, a particle separation and heat transfer system and a power plant.

2. Description of the Related Art

A substantial source of waste heat available for utilization in power production is waste heat from cement plants. This heat is available in the form streams of hot flue gasses and hot air.

However, a significant obstacle to the utilization of this heat source is the fact the gas and air carries a substantial quantity of abrasive dust. Because these sources usually have very small gage pressure (i.e., pressure above atmospheric pressure) it is impossible to install effective filters to separate this dust directly from the gaseous stream.

If these heat source are not cleaned of dust, the dust will cause substantial erosion of the surfaces of heat exchangers and diminishes the efficiency of heat transfer as a result of the dust being deposited as sedimentation on the heat transfer surfaces.

Thus, there is a need in the art for a efficient apparatus, system and method for transferring heat from a cement plant flue gas stream, which typically includes larger particles and dust to a working fluid stream of a power plant without exposing the equipment to the erosive forces of entrained larger particles and dust.

SUMMARY OF THE INVENTION

The present inventions provides an apparatus including a cement plant CP. The apparatus also includes a particulate separation and heat transfer system PSHTS. The apparatus also include a power plant PP. The apparatus is characterized in that the cement plant CP producing a hot gas stream including large particles and dust, the PSHTS removes the large particles and the dust to produce a heated high temperature transfer fluid stream and transfer its heat to a working fluid stream of the power plant PP where a portion of its heat is converted to a usable form of energy.

The PSHTS can include a separator C adapted to remove substantially all large particles from the hot gas stream from the cement plant CP. The PSHTS also includes a scrubber S adapted to bring the substantially large particle-free hot gas stream into heat exchange with a cooled high temperature heat transfer fluid stream to from a cooled gas stream and a heated high temperature heat transfer fluid stream including a portion of the dust from the gas stream. The PSHTS also includes a pump P adapted to raise a pressure of the heated high temperature heat transfer fluid stream to a desired high pressure. The PSHTS also includes a fan F adapted to remove substantially all of the dust from the pressurized heated high temperature heat transfer fluid stream. Finally, the PSHTS also includes a heat exchanger HE transferring heat from the substantially dust-free high temperature heat transfer fluid stream to the working fluid stream of the power plant PP to form the vaporized working fluid stream.

The scrubber S can include a packing structure and the packing structure can include a corrugated material and a non-corrugated material formed into a roll.

The PSHTS can include a separator C adapted to remove substantially all large particles from the hot gas stream from the cement plant CP. The PSHTS also includes a pump P adapted to raise a pressure of the substantially large particle-free hot gas stream to a desired high pressure. The PSHTS also includes a fan F adapted to remove substantially all of the dust from the pressurized substantially large particle-free hot gas stream to a desired high pressure to form a substantially large particle and dust free hot gas stream. The PSHTS also includes a scrubber S adapted to bring the substantially large particle and dust free hot gas stream into heat exchange with a cooled high temperature heat transfer fluid stream to from a cooled substantially large particle and dust free gas stream and a heated high temperature heat transfer fluid stream including a portion of the dust from the gas stream. The PSHTS also includes a heat exchanger HE transferring heat from the substantially dust-free high temperature heat transfer fluid to the working fluid stream of the power plant PP to form the vaporized working fluid stream.

The present invention also provides an apparatus including a cement plant CP and a particulate separation and heat transfer system PSHTS. The PSHTS comprising a separator C adapted to remove substantially all large particles from the hot gas stream from the cement plant CP, a scrubber S adapted to bring the substantially large particle-free hot gas stream into heat exchange with a cooled high temperature heat transfer fluid stream to from a cooled gas stream and a heated high temperature heat transfer fluid stream including a portion of the dust from the gas stream, a pump P adapted to raise a pressure of the heated high temperature heat transfer fluid stream to a desired high pressure, a fan F adapted to remove substantially all of the dust from the pressurized heated high temperature heat transfer fluid stream, and a heat exchanger HE transferring heat from the substantially dust-free high temperature heat transfer fluid stream to the working fluid stream of the power plant PP to form the vaporized working fluid stream. The apparatus also includes a power plant PP. The apparatus is characterized in that the cement plant CP producing a hot gas stream including large particles and dust, the PSHTS removes the large particles and the dust to produce a heated high temperature transfer fluid stream and transfer its heat to a working fluid stream of the power plant PP where a portion of its heat is converted to a usable form of energy. The scrubber S includes a packing structure and the packing structure comprises a corrugated material and a non-corrugated material formed into a roll.

The present invention also provides an apparatus including a cement plant CP and a particulate separation and heat transfer system PSHTS. The PSHTS includes a separator C adapted to remove substantially all large particles from the hot gas stream from the cement plant CP, a pump P adapted to raise a pressure of the substantially large particle-free hot gas stream to a desired high pressure, a fan F adapted to remove substantially all of the dust from the pressurized substantially large particle-free hot gas stream to a desired high pressure to form a substantially large particle and dust free hot gas stream, a scrubber S adapted to bring the substantially large particle and dust free hot gas stream into heat exchange with a cooled high temperature heat transfer fluid stream to from a cooled substantially large particle and dust free gas stream and a heated high temperature heat transfer fluid stream including a portion of the dust from the gas stream, and a heat exchanger HE transferring heat from the substantially dust-free high temperature heat transfer fluid to the working fluid stream of the power plant PP to form the vaporized working fluid stream. The apparatus also includes a power plant PP. The apparatus is characterized into that the cement plant CP producing a hot gas stream including large particles and dust, the PSHTS removes the large particles and the dust to produce a heated high temperature transfer fluid stream and transfer its heat to a working fluid stream of the power plant PP where a portion of its heat is converted to a usable form of energy. The scrubber S includes a packing structure and the packing structure comprises a corrugated material and a non-corrugated material formed into a roll.

The present invention also provides a method for extracting heat from a cement plant hot gas stream including forwarding a hot gas stream including large particles and dust from a cement plant CP to a particulate separation and heat transfer system PSHTS. The method also includes forming a heated high temperature heat transfer fluid stream substantially free of large particles and dust in the PSHTS. The method also includes transferring heat from the substantially large particle and dust free heated high temperature heat transfer fluid stream to a working fluid stream of a power plant PP to from a vaporized working fluid stream. The method also includes converting a portion of heat in the vaporized working fluid stream to a usable form of energy.

The present invention also provides a method including forwarding a hot gas stream including large particles and dust from a cement plant CP to a large particle separator C to from a substantially large particle free hot gas stream. The method also includes simultaneously forwarding the substantially large particle free hot gas stream via a bottom port into a scrubber S, and a cooled high temperature heat transfer fluid stream via an upper side port into the scrubber S to form a cooled substantially dust free gas stream exiting the scrubber S via a top port and a heated high temperature heat transfer fluid stream including substantially all of the dust from the of the substantially large particle free hot gas stream exiting the scrubber S via a lower side port. The method also includes pressurizing the dust containing, heated high temperature heat transfer fluid stream in a pump P to a desired higher pressure to form a pressurized dust containing, heated high temperature heat transfer fluid stream. The method also includes filtering the pressurized dust containing, heated high temperature heat transfer fluid stream in a filter or a plurality of filters to form a substantially dust free heated high temperature heat transfer fluid stream. The method also includes heating a working fluid stream from a power plant PP in a heat exchanger HE to form a heated working fluid stream and the cooled high temperature heat transfer fluid stream. The method also includes converting a portion of the heated working fluid stream in the power plant PP to a usable form of energy. The scrubber S includes a packing structure and the packing structure comprises a corrugated material and a non-corrugated material formed into a roll.

The present invention also provides a method including forwarding a hot gas stream including large particles and dust from a cement plant CP to a large particle separator C to from a substantially large particle free hot gas stream. The method also includes pressurizing the substantially large particle free, hot gas stream in a pump P to a desired higher pressure to form a pressurized substantially large particle free, hot gas stream. The method also includes filtering the pressurized substantially large particle free, hot gas stream in a filter or a plurality of filters to form a substantially large particle and dust free, hot gas stream. The method also includes simultaneously forwarding the substantially large particle and dust free hot gas stream via a bottom port into a scrubber S, and a cooled high temperature heat transfer fluid stream via an upper side port into the scrubber S to form a cooled substantially dust free gas stream exiting the scrubber S via a top port and a heated high temperature heat transfer fluid stream including substantially all of the dust from the of the substantially large particle free hot gas stream exiting the scrubber S via a lower side port. The method also includes heating a working fluid stream from a power plant PP in a heat exchanger HE to form a heated working fluid stream and the cooled high temperature heat transfer fluid stream. The method also includes converting a portion of the heated working fluid stream in the power plant PP to a usable form of energy. The scrubber S includes a packing structure and the packing structure comprises a corrugated material and a non-corrugated material formed into a roll.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventor has constructed a system and method for transferring heat from a hot flue gas stream produced by a cement plant to a high temperature heat transfer fluid stream and to a working fluid stream without exposing the equipment or most of the equipment to the erosive propensity of the hot flue gas cement plant stream, with includes large particles and dust.

The subject of the proposed invention is a process and apparatus for separating dust from gaseous waste heat sources and providing effective heat transfer to the working fluid of a power cycle that utilizes such waste heat.

Figure 1:
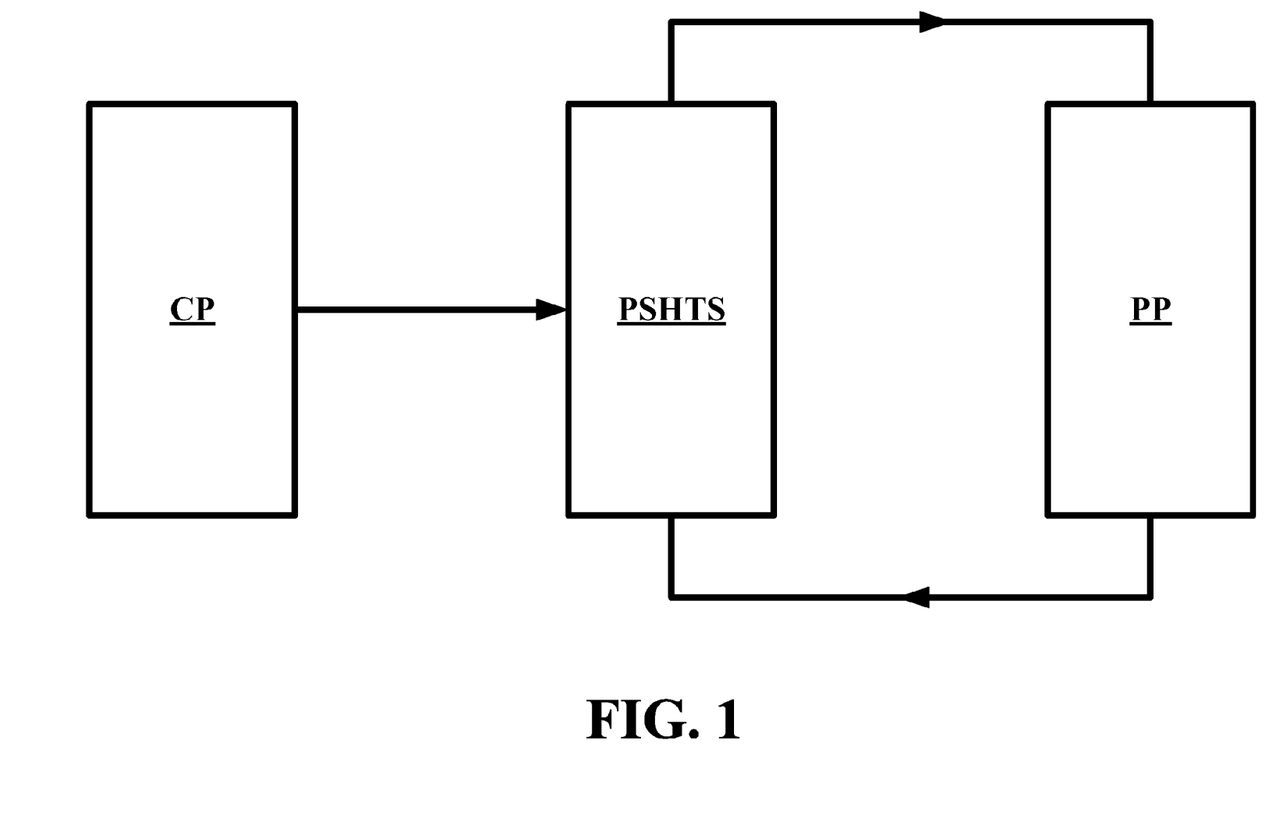
FIG. 1 depicts an embodiment of an apparatus of this invention.

Referring now to FIG. 1, an embodiment of a system of this invention, generally 100, is shown to include a cement plant CP, a particulate separation and heat transfer system PSHT adapted to receive a hot gas stream S1 from the cement plant CP including large particles and dust and a power plant PP adapted to send a working fluid stream S2 through the PSHT to form a vaporized working fluid S3 from which the power plant PP converts a portion of its heat into a usable form of energy. The power plant PP can be power cycle as described in U.S. Pat. Nos. 6,829,895, 6,820,421, 6,735,948, 6,923,000, 6,769,256, 6,941,757, 6,910,334, 7,065,969, 7,264,654, 7,065,967, 6,968,690, 7,043,919, 7,398,651, 7,021,060, 7,350,471, 7,055,326, Ser. Nos. 11/227,991, 11/099,211, 11/235,654, U.S. Pat. No. 7,197,876, Ser. Nos. 11/399,306, 11/399,287 and 11/514,290, these references are incorporated by reference according to the final paragraph of this application.

Figure 2A:
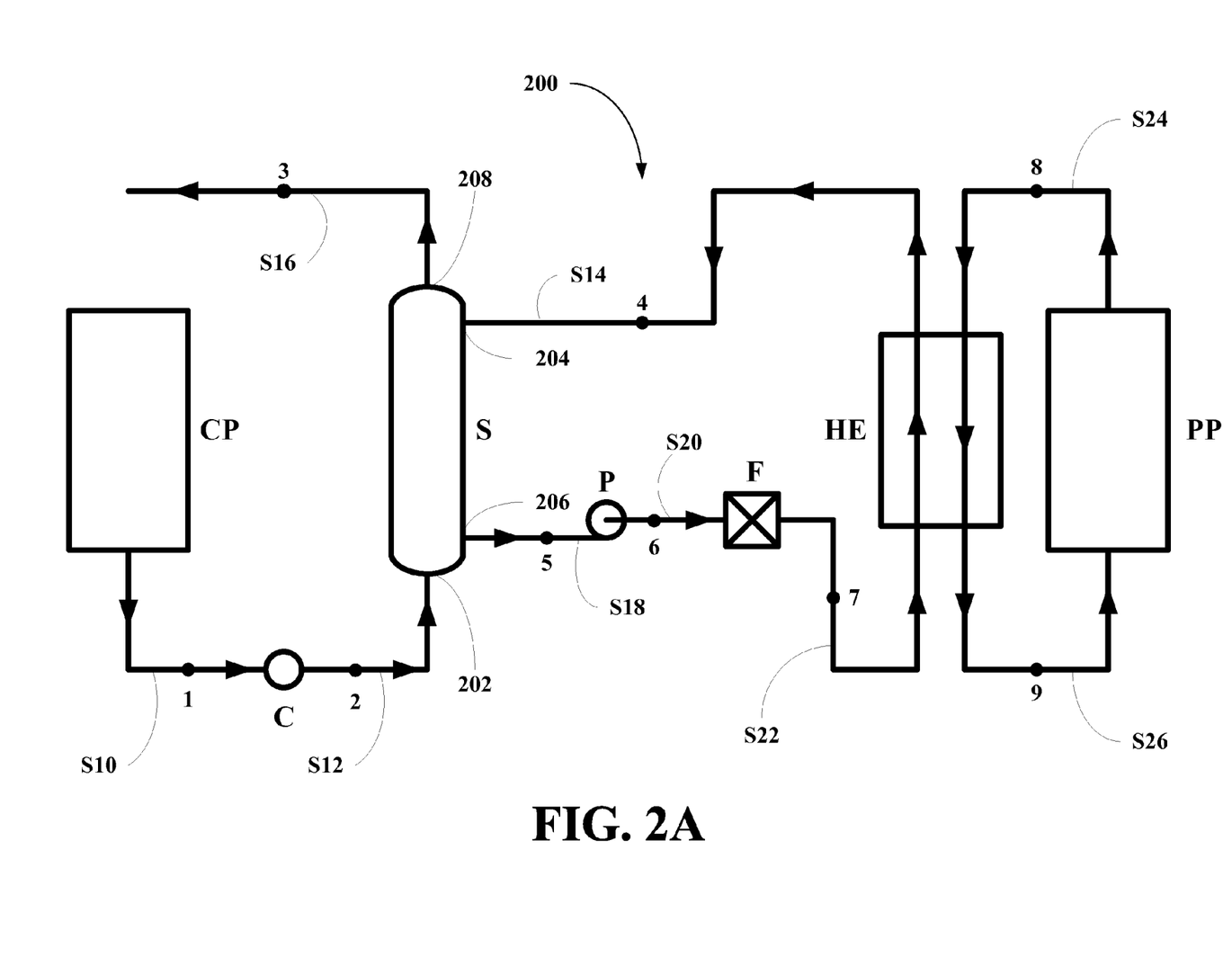
FIG. 2A depicts another embodiment of an apparatus of this invention.

Referring now to FIG. 2A, an embodiment of a system of this invention, generally 100, is shown to include a centripetal separator (a so called "cyclone" separator) C, a scrubber S, a recirculating pump P for circulated a high temperature heat transfer fluid, a filter F, and a heat exchanger HE. The centripetal separator C removed large particulate material form a hot gas stream from a cement plant CP and the heat exchanger HE is used to transfer heat from the transfer fluid to a working fluid of a power plant PP based on a thermodynamic cycle.

The system of FIG. 2A operates as follows. A hot gas stream S10 having parameters as at a point 1 from the cement plant CP passes through the cyclone separator C, where large particles of dust are separated from the hot gas stream S10 having the parameters as at the point 1 by centripetal forces to form a partially cleaned hot gas stream S12 having parameters as at a point 2. One experienced in the art can easily select a proper type and design of the cyclone separator C for this purpose.

Thereafter, the partially cleaned hot gas stream S12 having the parameters as at the point 2, still carrying a substantial quantity of dust, is sent into a bottom port 102 of the scrubber S. Simultaneously, a cooled high temperature heat transfer fluid stream S14 having parameters as at a point 4 is forwarded to an upper side port 104 of the scrubber S. The high temperature heat transfer fluid comprises any high temperature heat transfer fluid known in the art.

The partially cleaned hot gas stream S12 having the parameters as at the point 2 is cooled in the scrubber S to form a cooled gas stream S16 having parameters as at a point 3 and the cooled high temperature heat transfer fluid S14 having the parameters as at the point 4 is heated to form a heated high temperature heat transfer fluid stream S18 having parameters as at a point 5.

Thereafter, the heated high temperature heat transfer fluid S18 having the parameters as at the point 5, which has been heated by the gas stream S12 having the parameters as at the point 2, and now carries the dust that was brought into the scrubber S by the gas steam S12 having the parameters as at the point 2, leaves the scrubber S via a lower side port 106. Meanwhile, the cooled gas stream S16 having the parameters as at the point 3 leaves the scrubber S via a top port 108.

Thereafter, the high temperature heat transfer fluid S18 having the parameters as at the point 5 enters into a pump P, where its pressure is increased to form a high pressure, heated high temperature heat transfer fluid stream S20 having parameters as at a point 6. Thereafter, the high pressure, heated high temperature heat transfer fluid stream S20 having the parameters as at the point 6 passes through a filter F, where the dust present in the stream S20 is separated from the fluid to form a substantially dust free, high pressure, heated high temperature heat transfer fluid stream S22 having parameters as at a point 7. While any filter capable of separating the dust from the fluid can be used, the most suitable filters for this purpose are knitted mesh filters which can operated at very high temperatures as is well known in the art.

The substantially dust free, high pressure, heated high temperature heat transfer fluid stream S22 having the parameters as at the point 7 comprising a high temperature heat transfer fluid which has been effectively cleaned of dust, is then sent into a heat exchanger HE. In the heat exchange HE, the substantially dust free, high pressure, heated high temperature heat transfer fluid stream S22 having the parameters as at the point 7 moves in counterflow with a working fluid stream S24 having parameters as at a point 8 from a power cycle system (not shown). Here heat from the high temperature heat transfer fluid stream S22 having the parameters as at the point 7 is transferred to the working fluid stream S24 having the parameters as at the point 8 to from a vaporized working fluid stream S26 having parameters as at a point 9 of the power plant PP.

Thereafter, the now cooled high heat transfer fluid exits the heat exchanger HE as the cooled high temperature heat transfer fluid stream S14 having the parameters as at the point 4 prior to being sent into the scrubber S (see above), thus completing the system.

Figure 2B:
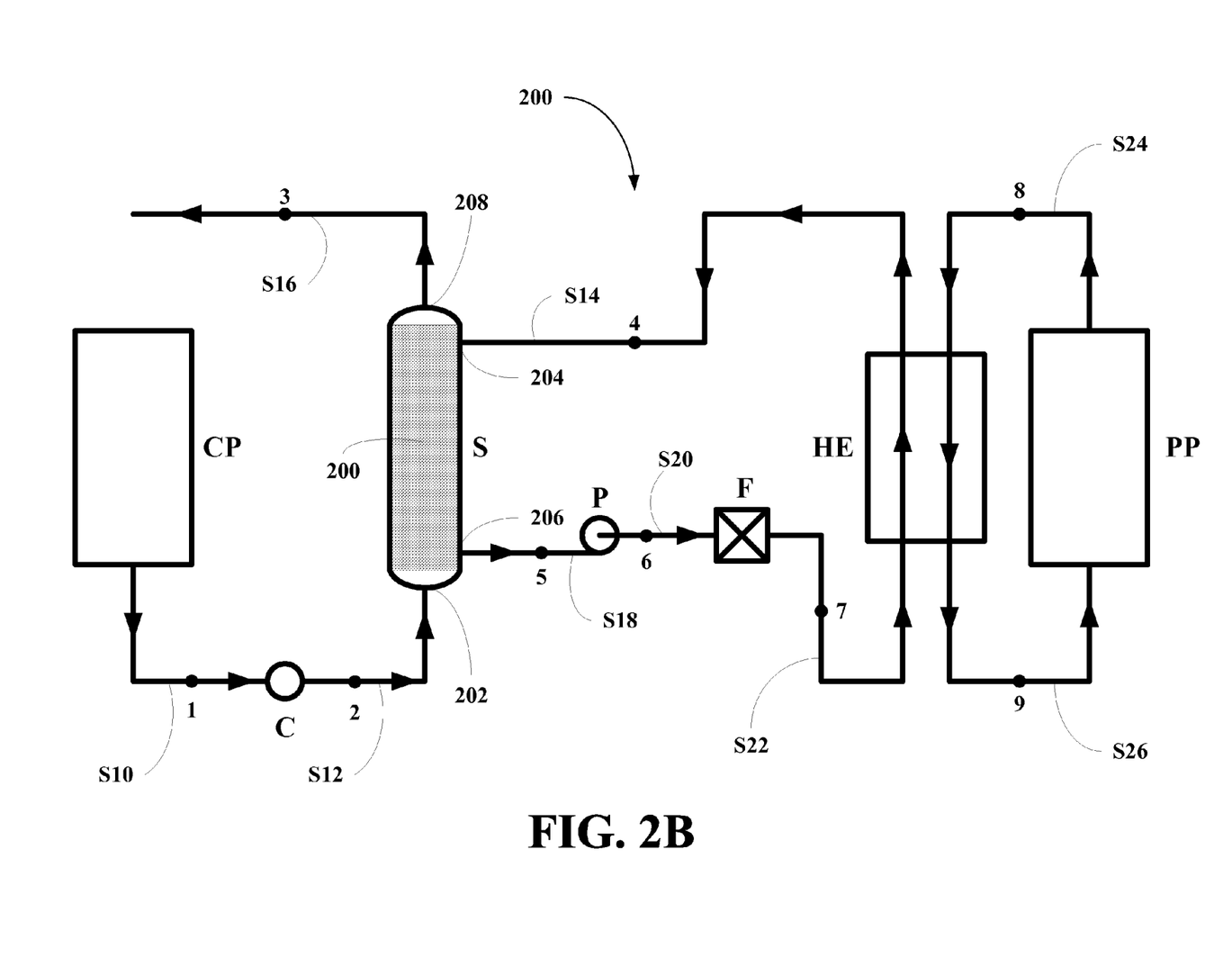
FIG. 2B depicts another embodiment of an apparatus of this invention.

Referring now to FIG. 2B, an embodiment of a system of this invention, generally 200, is shown to include a centripetal separator (a so called "cyclone" separator) C, a scrubber S having a packing 300, a recirculating pump P for circulated a high temperature heat transfer fluid, a filter F, and a heat exchanger HE, in which heat is transferred for the transfer fluid to a working fluid of a power cycle (not shown).

Figure 3:
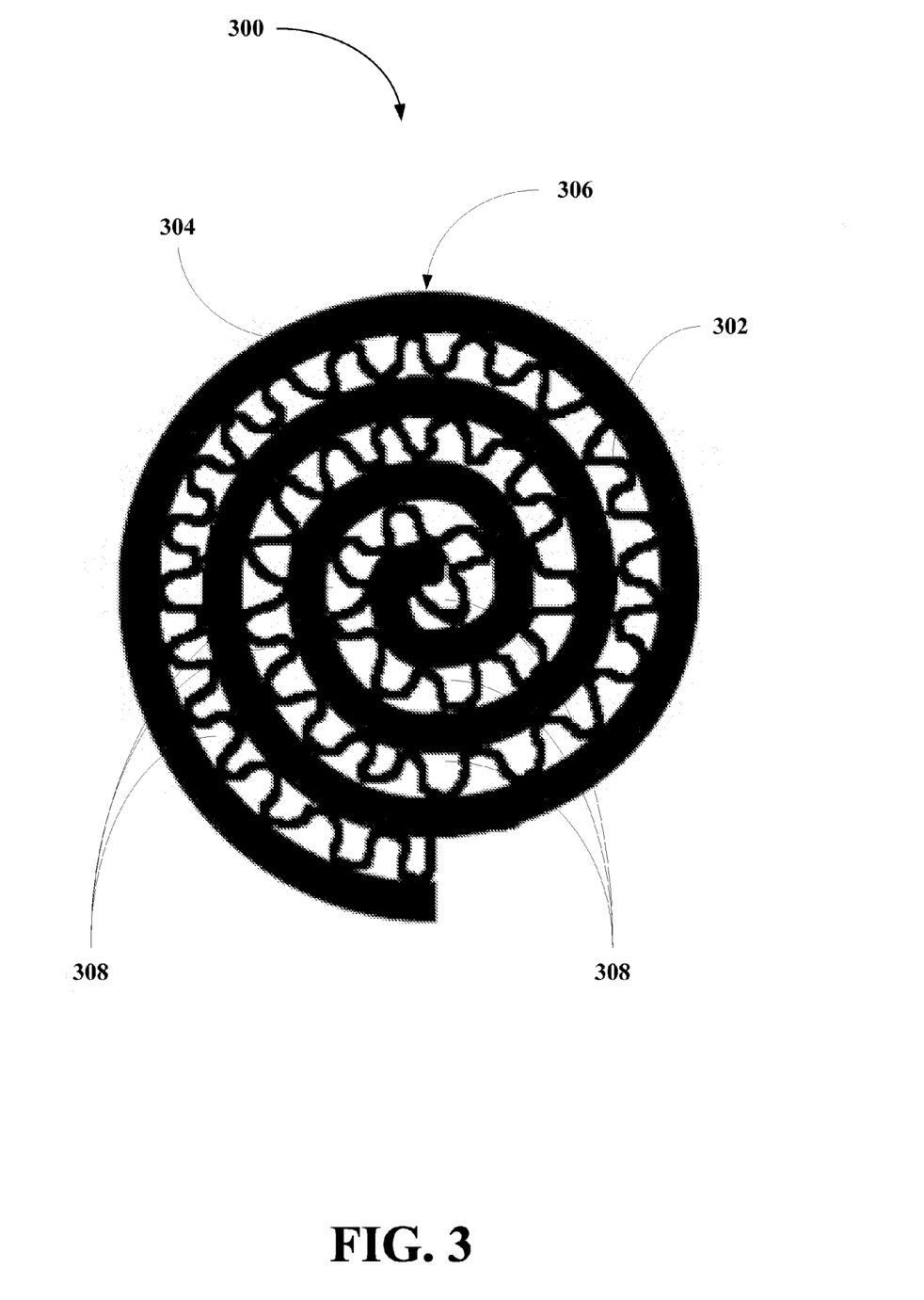
FIG. 3 depicts an embodiment of a scrubber packing of this invention.

Referring now to FIG. 3, one embodiment of the scrubber S includes the packing 300 comprising a sheet of corrugated material 302 (metal or other suitable high temperature material) layered with a sheet of non corrugated material 304, and then formed into a roll 306. However other types of scrubbers can be used as well, including scrubers with combinations of different sorts of packing.

Such a packing 306 forms multiple vertical channels 308 through which the heat transfer fluid flows down as a film on surfaces of these vertical channels 308. At the same time, the dust laden gas flows up a center of these vertical channels 308.

In such a scrubber S including the packing 306, the cleaned hot gas stream S12 having the parameters as at the point 2 is cooled to form a cooled gas stream S28 having parameters as at a point 3 and the high temperature heat transfer fluid S14 having the parameters as at the point 4 is heated to form a high temperature transfer fluid stream S30 having parameters as at a point 5. Particles of dust cannot contact the surface of the packing material 306 directly, but rather contact the surface of a film of down-flowing heat transfer fluid. Because a density of the liquid is many times higher than the density of the gas, the particles of dust that penetrate through the down-flowing film of liquid lose their kinetic energy and thus cannot cause damaging erosion of the packing material 206 of the scrubber S. In general, one experienced in the art can choose and/or design an appropriate type of scrubber S for this purpose.

Figure 2C:
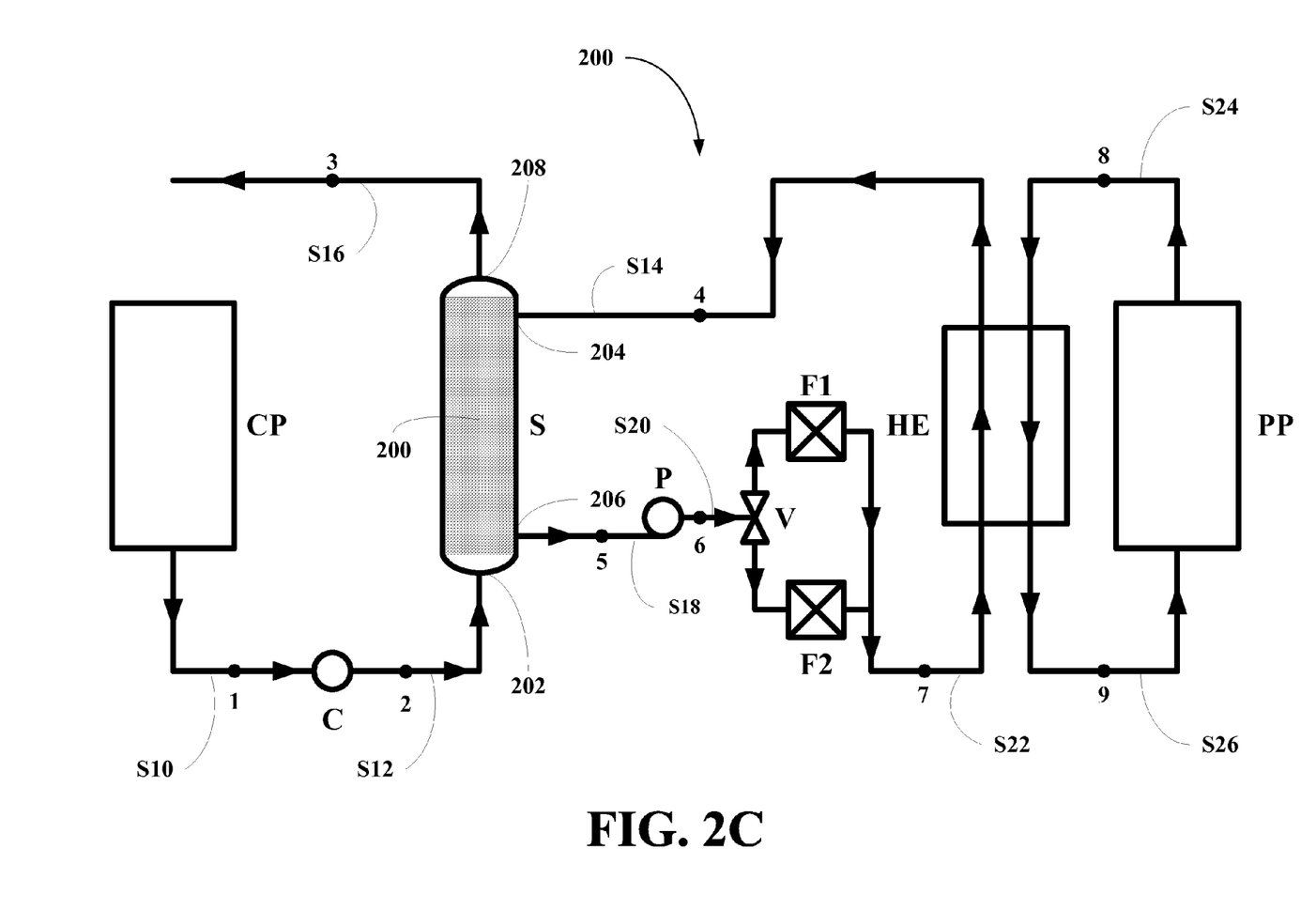
FIG. 2C depicts another embodiment of an apparatus of this invention.

Referring now to FIG. 2C, another embodiment of the system 200 is shown to include a plurality of filters Fn, here two F1 and F2 and a control valve V. The two filters F1 and F2 are installed in parallel so that one of the filters is in operation and the other is standing by. When one filter becomes overly filled by dust, operation switches to the other filter, while the first filter is cleaned and then returned to use when the second filter is overly filled. The same procedure can be used with a plurality of filters in fact, the stream.

Figure 2D:
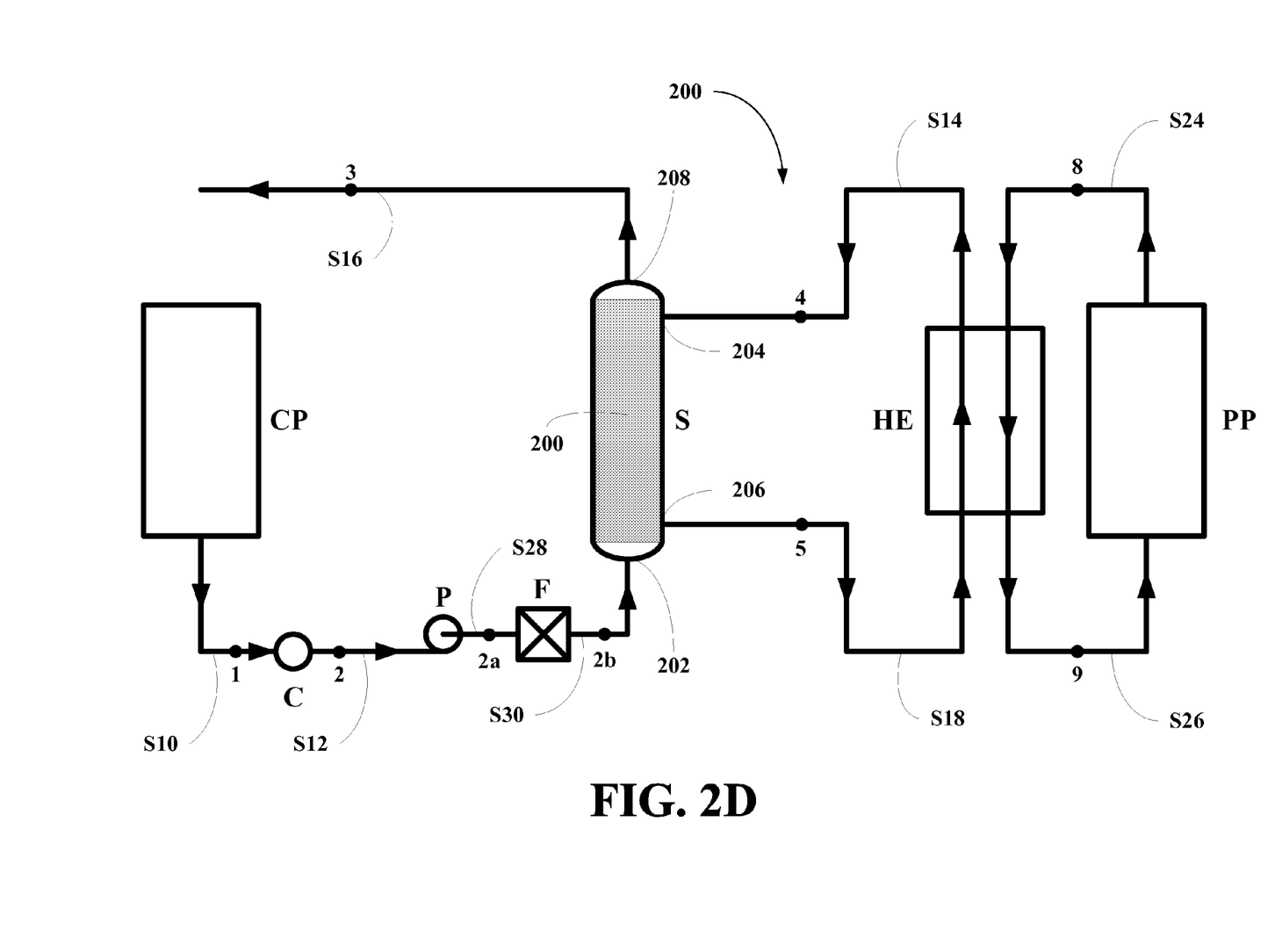
FIG. 2D depicts another embodiment of an apparatus of this invention.

Referring now to FIG. 2D, another embodiment of the system 200 is shown to include a relocation of the pump P and the filter F, where the pump P (now a compressor) raises a pressure of the partially cleaned gas stream S12 having the parameters as at the point 2 to form a high pressure dust laden gas stream S42 having parameters as at a point 2a. The gas stream S28 having the parameters as at the point 2a is passed through a filter F to form a substantially dust-free high pressure gas stream S44 having parameters as at a point 2b. However, such a compressor would use a great deal of power and would be subject to heavy erosion from the entrained dust. As in FIG. 2C, this embodiment can include a plurality of filters Fn with valves so that one can be in use, while the other on stand by or being cleaned.

The systems of this invention not only prevents erosion of heat transfer equipment due to dust, but also provides a substantial increase in the efficiency of heat transfer from the heat source to the power cycle. Heat transfer in the scrubber S, which is in essence a direct contact heat exchanger, is extremely efficient. Heat transfer in the heat exchanger HE, because it is performed by a fluid of much higher density than gas, is also many times more efficient than would be the case if the heat transfer was performed directly from the heat source gas to the working fluid of the power cycle.

An additional advantage of such a system is the ability to operate without interruptions to clean the surfaces of heat transfer apparatus from dust, which in turn provides for a high availability and reliability of the proposed system.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. An apparatus comprising:
    a cement plant CP,
    a particulate separation and heat transfer system PSHTS comprising:
        a separator C adapted to remove substantially all large particles from the hot gas stream from the cement plant CP,
        a scrubber S adapted to bring the substantially large particle-free hot gas stream into heat exchange with a cooled high temperature heat transfer fluid stream to from a cooled gas stream and a heated high temperature heat transfer fluid stream including a portion of the dust from the gas stream, a pump P adapted to raise a pressure of the heated high temperature heat transfer fluid stream to a desired high pressure,
        a fan F adapted to remove substantially all of the dust from the pressurized heated high temperature heat transfer fluid stream, and
        a heat exchanger HE transferring heat from the substantially dust-free high temperature heat transfer fluid stream to the working fluid stream of the power plant PP to form the vaporized working fluid stream, and a power plant PP,
    where the cement plant CP producing a hot gas stream including large particles and dust, the PSHTS removes the large particles and the dust to produce a heated high temperature transfer fluid stream and transfer its heat to a working fluid stream of the power plant PP where a portion of its heat is converted to a usable form of energy.

2. The apparatus of claim 1, wherein the scrubber S includes a packing structure.

3. The apparatus of claim 2, wherein the packing structure comprises a corrugated material and a non-corrugated material formed into a roll.

4. An apparatus comprising:
    a cement plant CP,
    a particulate separation and heat transfer system PSHTS comprising:
        a separator C adapted to remove substantially all large particles from the hot gas stream from the cement plant CP,
        a pump P adapted to raise a pressure of the substantially large particle-free hot gas stream to a desired high pressure,
        a fan F adapted to remove substantially all of the dust from the pressurized substantially large particle-free hot gas stream to a desired high pressure to form a substantially large particle and dust free hot gas stream,
        a scrubber S adapted to bring the substantially large particle and dust free hot gas stream into heat exchange with a cooled high temperature heat transfer fluid stream to from a cooled substantially large particle and dust free gas stream and a heated high temperature heat transfer fluid stream including a portion of the dust from the gas stream, and
        a heat exchanger HE transferring heat from the substantially dust-free high temperature heat transfer fluid to the working fluid stream of the power plant PP to form the vaporized working fluid stream, and
    a power plant PP,
    where the cement plant CP producing a hot gas stream including large particles and dust, the PSHTS removes the large particles and the dust to produce a heated high temperature transfer fluid stream and transfer its heat to a working fluid stream of the power plant PP where a portion of its heat is converted to a usable form of energy.

5. The apparatus of claim 4, wherein the scrubber S includes a packing structure.

6. The apparatus of claim 5, wherein the packing structure comprises a corrugated material and a non-corrugated material formed into a roll.

7. A method comprising:
    forwarding a hot gas stream including large particles and dust from a cement plant CP to a large particle separator C to from a substantially large particle free hot gas stream,
    simultaneously forwarding the substantially large particle free hot gas stream via a bottom port into a scrubber S, and a cooled high temperature heat transfer fluid stream via an upper side port into the scrubber S to form a cooled substantially dust free gas stream exiting the scrubber S via a top port and a heated high temperature heat transfer fluid stream including substantially all of the dust from the of the substantially large particle free hot gas stream exiting the scrubber S via a lower side port,
    pressurizing the dust containing, heated high temperature heat transfer fluid stream in a pump P to a desired higher pressure to form a pressurized dust containing, heated high temperature heat transfer fluid stream,
    filtering the pressurized dust containing, heated high temperature heat transfer fluid stream in a filter or a plurality of filters to form a substantially dust free heated high temperature heat transfer fluid stream, and
    heating a working fluid stream from a power plant PP in a heat exchanger HE to form a heated working fluid stream and the cooled high temperature heat transfer fluid stream.

8. The method of claim 7, further comprising:
    converting a portion of the heated working fluid stream in the power plant PP to a usable form of energy.

9. The method of claim 7, wherein the scrubber S includes a packing structure.

10. The method of claim 9, wherein the packing structure comprises a corrugated material and a non-corrugated material formed into a roll.

11. A method comprising:

forwarding a hot gas stream including large particles and dust from a cement plant CP to a large particle separator C to from a substantially large particle free hot gas stream, pressurizing the substantially large particle free, hot gas stream in a pump P to a desired higher pressure to form a pressurized substantially large particle free, hot gas stream, filtering the pressurized substantially large particle free, hot gas stream in a filter or a plurality of filters to form a substantially large particle and dust free, hot gas stream, simultaneously forwarding the substantially large particle and dust free hot gas stream via a bottom port into a scrubber S, and a cooled high temperature heat transfer fluid stream via an upper side port into the scrubber S to form a cooled substantially dust free gas stream exiting the scrubber S via a top port and a heated high temperature heat transfer fluid stream including substantially all of the dust from the of the substantially large particle free hot gas stream exiting the scrubber S via a lower side port, and heating a working fluid stream from a power plant PP in a heat exchanger HE to form a heated working fluid stream and the cooled high temperature heat transfer fluid stream.

12. The method of claim 11, further comprising:

converting a portion of the heated working fluid stream in the power plant PP to a usable form of energy.

13. The apparatus of claim 11, wherein the scrubber S includes a packing structure.

14. The apparatus of claim 13, wherein the packing structure comprises a corrugated material and a non-corrugated material formed into a roll.

\* \* \* \* \*